Aug. 5, 1930.  J. CRITES  1,772,244
DEVICE FOR TRANSPORTING FINELY DIVIDED MATERIALS
Original Filed June 11, 1927
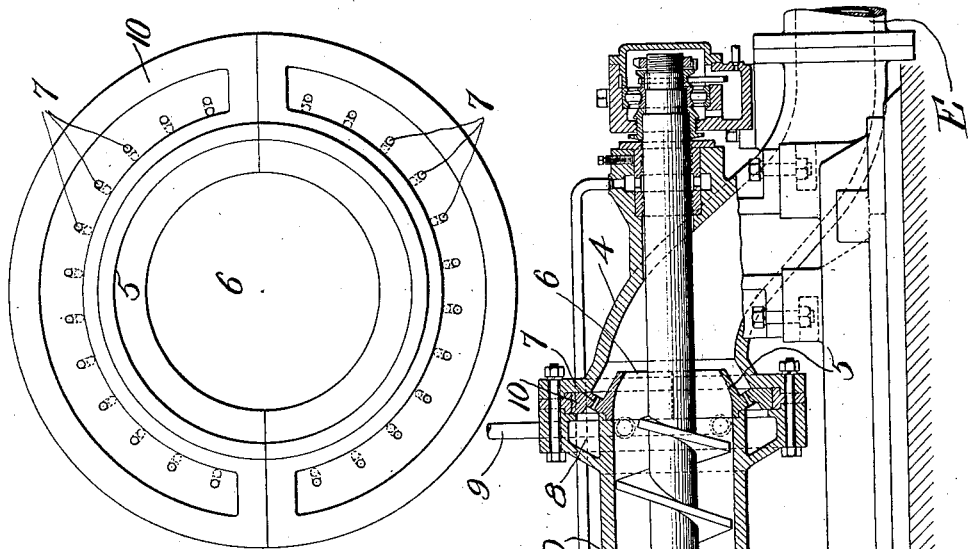
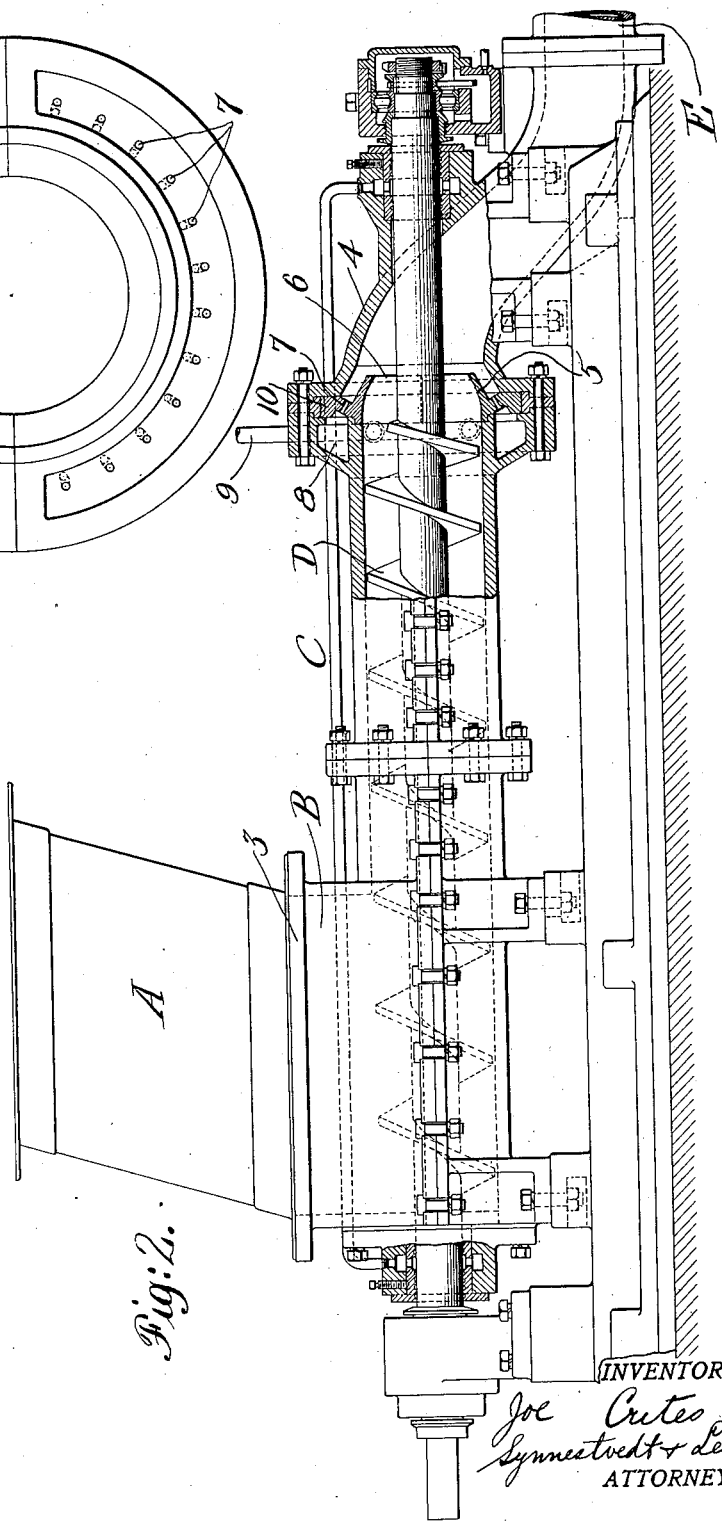
INVENTOR
Joe Crites
Synnestvedt & Lechner
ATTORNEYS Patented Aug. 5, 1930

1,772,244

UNITED STATES PATENT OFFICE

JOE CRITES, OF EVANSTON, ILLINOIS, ASSIGNOR TO INTERNATIONAL COMBUSTION ENGINEERING CORPORATION, OF NEW YORK, N. Y., A CORPORATION OF DELAWARE

DEVICE FOR TRANSPORTING FINELY-DIVIDED MATERIALS

Application filed June 11, 1927, Serial No. 198,039. Renewed June 6, 1930.

This invention relates to apparatus for transporting finely divided material. The invention will be described in connection with the transport of pulverized coal from one place to another, as from a preparing plant to a storage bin, although it is to be understood that it is useful in the transport of many other materials.

The invention is particularly concerned with that class of transporting apparatus employing compressed air for transporting the material through a transport line. In such apparatus the coal usually is advanced from a suitable source of supply to the sphere of pneumatic action by means of a feed screw. In such devices the compressed air should be prevented from blowing back through the feed screw to the source of supply. I am aware that it has been proposed heretofore to prevent "back flow" by various arrangements. In most instances, however, these have not been altogether successful, one of the main objections being that of heavy power consumption.

It is a primary object of my invention, therefore, to provide an improved transporting device of the class described which is of simple construction and in which back flow of the transporting fluid is effectively prevented, and in which power consumption is at a minimum.

A more specific object of my invention is the provision in a device of the character described of novel means for preventing the above mentioned "back flow," which may be readily replaceable for purposes which will hereinafter appear.

How the foregoing, together with such other objects and advantages as may hereinafter appear, or are incident to my invention, are realized is illustrated in preferred form in the accompanying drawings, wherein—

Fig. 1 is an elevation of a device embodying my invention with certain portions appearing in section, and Fig. 2 illustrates a detail of my invention.

In the drawings, a portion of a bin or other storage receptacle is denoted by the reference letter A, which receptacle contains the material to be transported, in this instance, the material being pulverized coal. The coal from the bin enters the inlet B of the feed barrel C and is advanced through the barrel by means of the feed screw D, which is rotated by means of a suitable driving device, not shown. The inlet B is in the form of a hopper and is provided with a flange 3 to which the bin may be secured in any suitable manner. Stated in another way the feed barrel C may be said to comprise a casing having a hopper-like material receiving portion and a barrel portion extending from the hopper-like portion.

A transport line E is connected with the barrel, in this instance through the medium of the fitting 4. Material advanced by the screw discharges into the fitting 4 and is conveyed through the transport line or conduit E to some distant point by means of pressure fluid, such as compressed air, which air is introduced in a manner hereinafter appearing.

In order to prevent "back flow" of the compressed air, that is, flow of the air back through the screw to the source of coal supply, I have provided novel means at the end of the feed barrel C which creates a region in which material packs to such a degree as will prevent the air from flowing back through the coal.

In the drawings this means is shown as comprising a detachable bell-shaped member 5 adapted to be held between the barrel C and the fitting 4 in any convenient manner. It will be seen that by employing such a member the outlet 6 through which the material discharged by the screw must pass in its passage to the fitting 4 is restricted, that is to say, the outlet opening 6 is smaller in diameter than the internal diameter of the feed barrel C. In consequence of this, the material, after leaving the feed screw, packs to a certain extent in the member 5 and blow back is prevented. The coal, after being discharged from the member 5, is subjected to the pressure air which conveys it to the line in a manner which will be hereinafter described.

By making the member 5 detachable it can be readily replaced with little expense in the event that it wears out. This is also advantageous for the reason that under some conditions it may be desirable to employ a member of different proportions than under other conditions, and through this feature it is a simple matter to substitute one member for another to obtain the best results. In this connection it is pointed out that a transport device primarily intended for effectively transporting coal, for example, could be used for effectively transporting materials having other characteristics by changing the compacting members. It will be noted that the barrel and the member 5 are so split as to make replacement of the member 5 a very simple matter.

The feed screw, as shown in the drawings, may have its pitch decreased toward the discharge end for the purpose of further ensuring against back flow.

The compressed air for transporting the coal through the transport line is admitted around the member 5 by means of a plurality of openings 7 which are in communication with an air chamber 8 to which compressed air is supplied by means of the pipe 9. The openings 7 are preferably of relatively small diameter and are relatively closely spaced around the member 5, so that a substantial cone of air is set up into which the coal discharges, thus preventing packing of the material on the walls of the fitting.

Stated in another way, the coal discharges into a surrounding body of air, in consequence of which frictional resistance is minimized and wear is reduced. By so introducing the air, the coal is not agitated, thus avoiding the possibility of destroying the effectiveness of the back flow preventing means. I preferably locate the holes 7 in a flange-like or ring portion 10 of the member 5, thus providing a very compact and simple arrangement.

In this connection it is to be noted that the member 5 is interposed between the column of material delivered by the screw and the air admission means whereby the air is caused to move in a direction in line with the movement of the column discharged by the screw, thus preventing agitation of the column of coal.

I have found by experience that a transport made in accordance with my invention and as shown in the drawings will effectively transport coal with a much reduced power consumption for rotating the screw, and I have also found that I can transport far greater distances and with less pressure of the air than in most prior constructions.

I claim:—

1. A finely divided material transporting device comprising a feed barrel having an inlet for the material to be transported; a rotatable screw for advancing material through said barrel; a transport line connected with the end of said barrel; and means for introducing compressed air into said line for conveying the material therethrough, said means including an air chamber adjacent the end of the barrel, and a member having means for preventing back flow of the air through the barrel and a plurality of air openings having communication with said chamber and said transport line, said openings being so disposed as to discharge air around the material as it leaves said member.

2. A finely divided material transporting device comprising a feed barrel having an inlet for the material to be transported; a rotatable screw for advancing material through said barrel; a transport line; a fitting connecting said line with the discharge end of the barrel; a member detachably secured between the end of the barrel and said fitting; said member having a bell-shaped portion through which material discharged by the screw passes in its passage to the fitting, a flanged portion whereby the member may be secured between the barrel and the fitting, and a plurality of air discharge openings at the flanged portion thereof; said feed barrel having a chambered flanged portion with which the openings in said member communicate, means for introducing pressure fluid to said chamber; said fitting having a flanged portion and the bore of the fitting at the end adjacent the member being of greater diameter than the diameter of the bell-shaped portion so as to provide a channel between said portion and the fitting into which the air openings discharge.

In testimony whereof, I have hereunto signed my name.

JOE CRITES.